(12) United States Patent
Kumagai et al.

(10) Patent No.: US 9,003,919 B2
(45) Date of Patent: Apr. 14, 2015

(54) CEILING-MOUNTED SCARA ROBOT

(75) Inventors: Yoshitaka Kumagai, Tokyo (JP); Mitsuhiro Fukatsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 69 days.

(21) Appl. No.: 13/819,126

(22) PCT Filed: Sep. 3, 2010

(86) PCT No.: PCT/JP2010/065141
§ 371 (c)(1),
(2), (4) Date: Feb. 26, 2013

(87) PCT Pub. No.: WO2012/029173
PCT Pub. Date: Mar. 8, 2012

(65) Prior Publication Data
US 2013/0152722 A1   Jun. 20, 2013

(51) Int. Cl.
*B25J 17/00* (2006.01)
*B25J 17/02* (2006.01)
(Continued)

(52) U.S. Cl.
CPC ............... *B25J 18/00* (2013.01); *B25J 9/0018* (2013.01); *B25J 9/042* (2013.01); *B25J 9/044* (2013.01); *Y10S 901/23* (2013.01); *Y10S 901/27* (2013.01); *Y10S 901/14* (2013.01)

(58) Field of Classification Search
CPC ............ B25J 18/00; B25J 9/042; B25J 18/04; B25J 9/0018; B25J 9/04; B25J 9/043; Y10S 901/14; Y10S 901/16
USPC .......... 74/490.01, 490.03, 490.05; 901/14, 16
See application file for complete search history.

(56) References Cited

U.S. PATENT DOCUMENTS 5,000,653 A * 3/1991 Gosdowski ................ 414/744.5
8,201,472 B2 * 6/2012 Feng ........................ 74/490.01
(Continued)

FOREIGN PATENT DOCUMENTS

JP   01-216786 A   8/1989
JP   1-148286 U   10/1989
(Continued)

OTHER PUBLICATIONS

Taiwanese Office Action, dated Mar. 26, 2013, Patent Application No. 099137740.

(Continued)

*Primary Examiner* — Justin Krause
(74) *Attorney, Agent, or Firm* — Sughrue Mion, PLLC; Richard C. Turner

(57) ABSTRACT

A ceiling-mounted SCARA robot includes: a base, a first arm that is connected to the lower side of the base via a first coupling part centering around a first articulated shaft and that can pivotally move around the first articulated shaft within a horizontal plane, a second arm that is connected to the lower side of the first arm via a second coupling part centering around a second articulated shaft and that can pivotally move around the second articulated shaft within a horizontal plane, a working shaft that is mounted on the second arm, a second articulated shaft motor and a second articulated shaft reducer for driving the second arm, and a working-shaft rotation motor that rotates the working shaft. The second articulated shaft reducer is provided on the second coupling part, and the working-shaft rotation motor is arranged directly below the second articulated shaft reducer.

4 Claims, 2 Drawing Sheets

(51) Int. Cl.
*B25J 18/00* (2006.01)
*B25J 9/00* (2006.01)
*B25J 9/04* (2006.01)

(56) References Cited

U.S. PATENT DOCUMENTS

| | | | |
|---|---|---|---|
| 2005/0087034 A1* | 4/2005 | Friedrich et al. | 74/490.03 |
| 2005/0166699 A1 | 8/2005 | Meyerhoff et al. | |
| 2009/0007713 A1 | 1/2009 | Meyerhoff et al. | |
| 2010/0050806 A1* | 3/2010 | Ono et al. | 74/490.02 |

FOREIGN PATENT DOCUMENTS

| | | |
|---|---|---|
| JP | 1-155504 U | 10/1989 |
| JP | 03-041314 A | 2/1991 |
| JP | 3-26479 U | 3/1991 |
| JP | 3-36787 U | 4/1991 |
| JP | 06-262555 A | 9/1994 |
| JP | 2003-045934 A | 2/2003 |
| JP | 2003-266344 A | 9/2003 |
| JP | 2005-193347 A | 7/2005 |
| JP | 2007-044839 A | 2/2007 |
| JP | 2012-531640 | 1/2013 |
| TW | 200910502 A | 3/2009 |

OTHER PUBLICATIONS

Communication dated Jul. 3, 2014 from the Chinese Patent Office in counterpart Chinese Patent Application 201080068856.2.
German Office Action for corresponding Application No. 11 2010 005 838.5 issued Jul. 17, 2014.

* cited by examiner

CEILING-MOUNTED SCARA ROBOT

CROSS REFERENCE TO RELATED APPLICATIONS

This application is a National Stage of International Application No. PCT/JP2010/065141 filed Sep. 3, 2010, the contents of all of which are incorporated herein by reference in their entirety.

FIELD

The present invention relates to a ceiling-mounted SCARA robot.

BACKGROUND

As one type of horizontal articulated industrial robots referred to as SCARA robots, a ceiling-mounted SCARA robot that is installed by being hung from a ceiling surface is known (see, for example, Patent Literatures 1 and 2).

CITATION LIST

Patent Literatures

Patent Literature 1: Japanese Patent Application Laid-open No. 2005-193347
Patent Literature 2: Japanese Patent Application Laid-open No. 6-262555

SUMMARY

Technical Problem

Each of arms and working shafts of a SCARA robot is driven by a motor and a reduction gear (hereinafter just "reducer" for convenience) provided on each of the arms and working shafts. As the motor and the reducer, which are heavy parts, are arranged to be closer to a tip end of the arm, the load on the motor and the reducer that drive the arm increases. Such a load becomes more noticeable as the SCARA robot is required to operate faster and more frequently.

The present invention has been achieved in view of the above problem, and an object of the present invention is to provide a ceiling-mounted SCARA robot that can reduce a load caused by driving of an arm.

Solution to Problem

In order to solve the aforementioned problems, a ceiling-mounted SCARA robot according to one aspect of the present invention is constructed in such a manner that it includes: a base; a first arm that is connected to the lower side of the base via a first coupling part centering around a first articulated shaft and that can pivotally move around the first articulated shaft as a center of pivotal movement within a horizontal plane; a second arm that is connected to the lower side of the first arm via a second coupling part centering around a second articulated shaft and that can pivotally move around the second articulated shaft as a center of pivotal movement within a horizontal plane; a working shaft that is mounted on the second arm; a second articulated shaft motor and a second articulated shaft reducer for driving the second arm; and a working-shaft rotation motor that rotates the working shaft, wherein the second articulated shaft reducer is provided on the second coupling part, and the working-shaft rotation motor is arranged directly below the second articulated shaft reducer. The second articulated shaft motor is arranged in a position that is between the second coupling part and the working shaft and directly below a first articulated shaft reducer at the lower side of the first arm. The arm length of the first arm and the arm length of the second arm are the same (shaft distances thereof are the same).

Advantageous Effects of Invention

The ceiling-mounted SCARA robot according to the present invention can reduce a load caused by driving of an arm.

DESCRIPTION OF EMBODIMENTS

Exemplary embodiments of a ceiling-mounted SCARA robot according to the present invention will be explained below in detail with reference to the accompanying drawings. The present invention is not limited to the embodiments.

Embodiment

Figure 1:
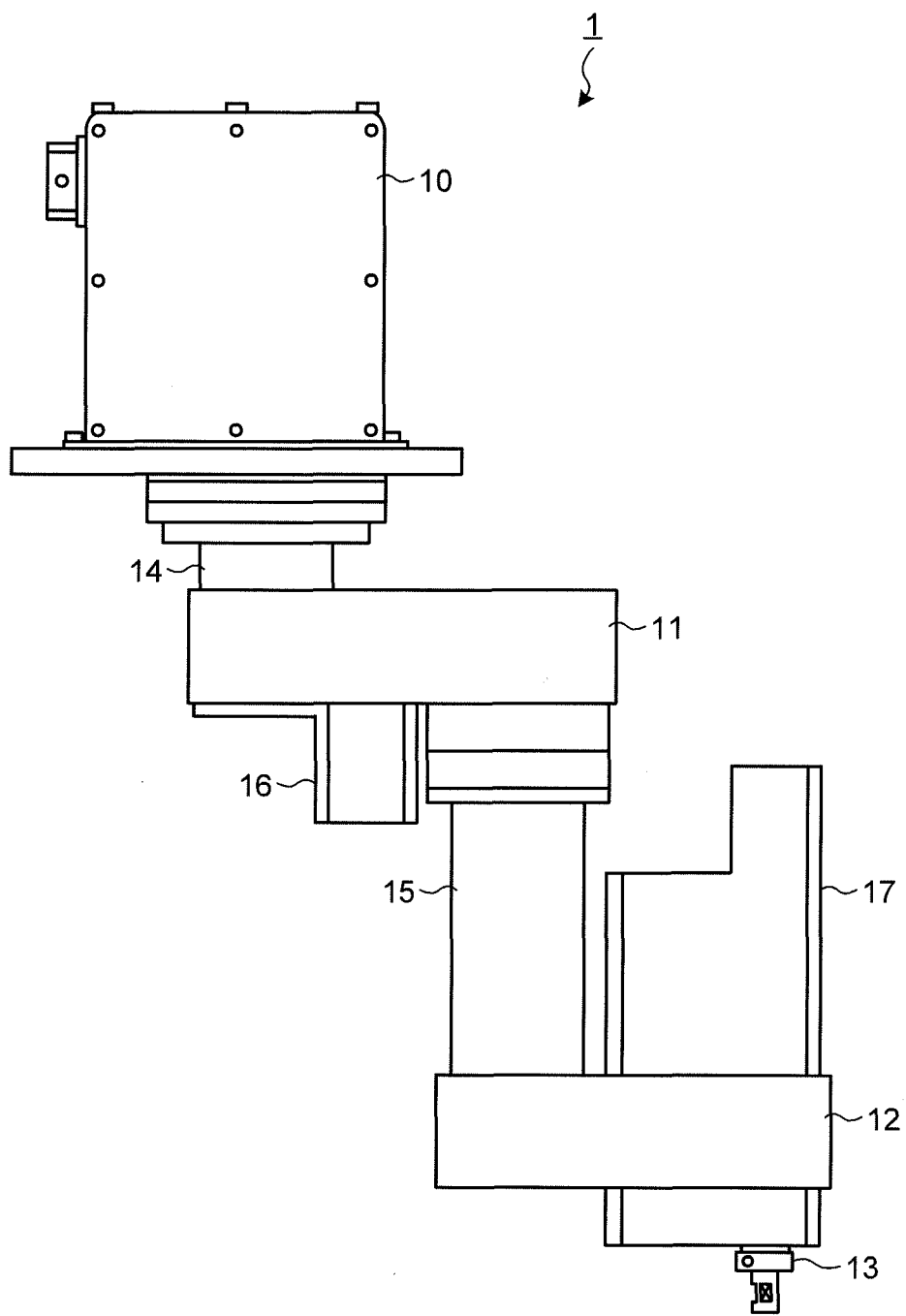
FIG. 1 is a front view of a ceiling-mounted SCARA robot according to an embodiment of the present invention.

FIG. 1 is a front view of a ceiling-mounted SCARA robot according to an embodiment of the present invention. A ceiling-mounted SCARA robot 1 includes a base 10, a first arm 11, a second arm 12, and a working shaft 13. The ceiling-mounted SCARA robot 1 is installed in such a manner that the base 10 is attached to a ceiling surface so as to be hung from the ceiling surface.

The first arm 11 is connected to the base 10 via a first coupling part 14 centering around a first articulated shaft. The first arm 11 is configured to be capable of pivotally moving around the first articulated shaft as a center of pivotal movement within a horizontal plane that is parallel to the ceiling surface. The second arm 12 is connected to the first arm 11 via a second coupling part 15 centering around a second articulated shaft. The second arm 12 is configured to be capable of pivotally moving around the second articulated shaft as a center of pivotal movement within a horizontal plane. The working shaft 13 is arranged at a tip portion of the second arm 12 to be able to move in a vertical and rotatable manner. A tool for conveying and machining workpieces is mounted on the working shaft 13.

The first arm 11 has arranged therein an accommodating space 16 that projects to the lower side thereof. The accommodating space 16 is arranged to be in parallel to the second coupling part 15 in a horizontal direction. The second arm 12 has arranged therein an accommodating space 17 that projects to the upper side thereof. The accommodating space 17 is arranged to be in parallel to the second coupling part 15 in a horizontal direction.

The arm length of the first arm 11 and the arm length of the second arm 12 are set to be equal. The arm length of the first arm 11 is set to be a distance between the first articulated shaft and the second articulated shaft. The arm length of the second arm 12 is set to be a distance between the second articulated shaft and a center of the working shaft 13. The first arm 11 and the second arm 12 are configured to pass by without interfering with each other because their pivoting surfaces are vertically shifted from each other.

Figure 2:
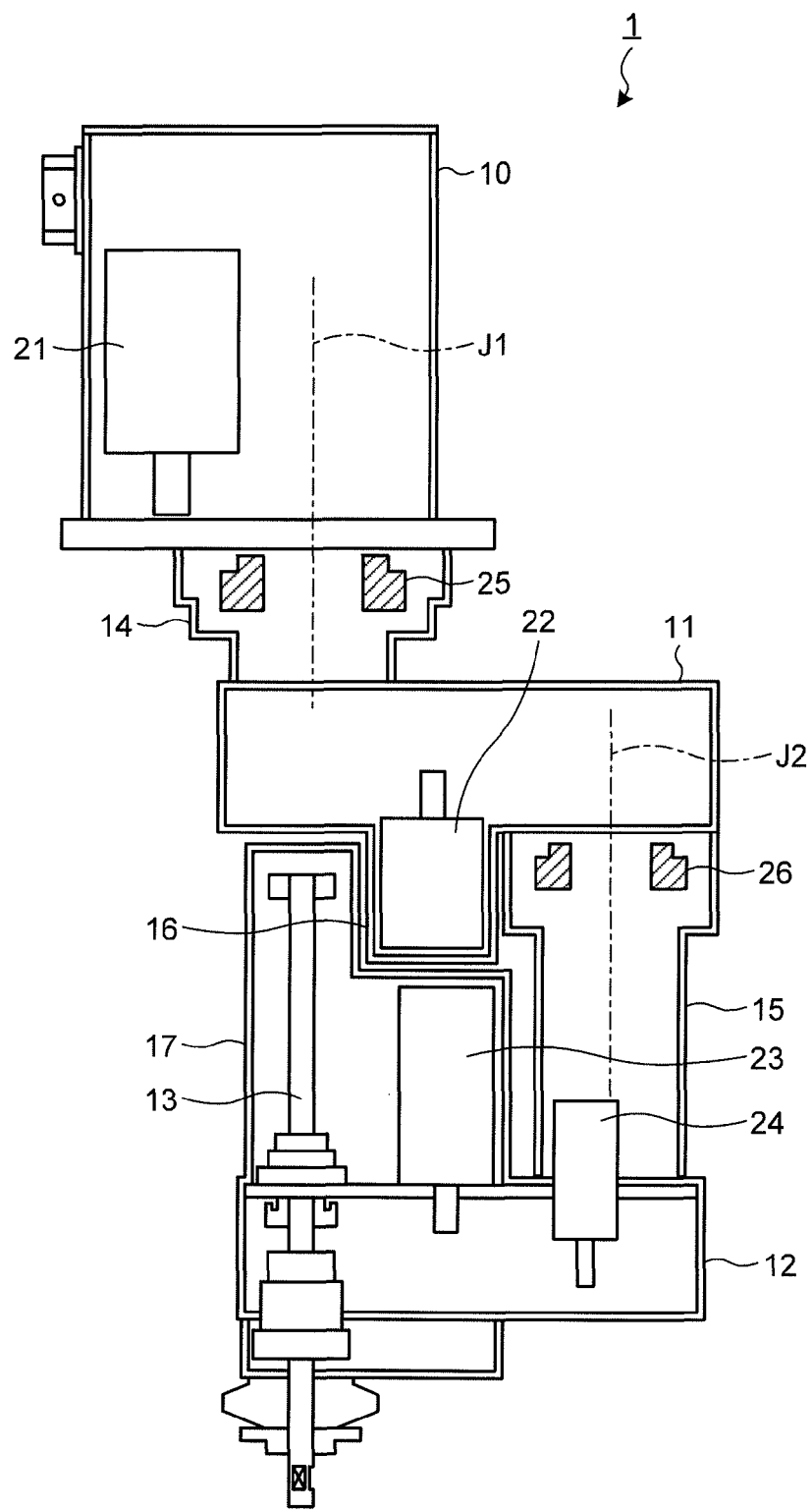
FIG. 2 is a schematic configuration diagram of the inside of the ceiling-mounted SCARA robot.

FIG. 2 is a schematic configuration diagram showing inside of the ceiling-mounted SCARA robot. Among the components arranged inside of the ceiling-mounted SCARA robot 1, those which are not necessary to be mentioned for the following explanations are not shown in FIG. 2. The ceiling-mounted SCARA robot 1 shown in FIG. 2 represents a state where the second arm 12 has been pivotally moved 180 degrees from the state shown in FIG. 1 and the second arm 12 is accommodated under the first arm 11 (hereinafter, this state is referred to as "accommodated state" as appropriate).

A first articulated shaft motor 21 and a first articulated shaft reducer 25 drive the first arm 11. The first articulated shaft motor 21 is arranged in the base 10. The first articulated shaft reducer 25 is arranged in the first coupling part 14. A second articulated shaft motor 22 and a second articulated shaft reducer 26 drive the second arm 12. The second articulated shaft motor 22 is arranged in the accommodating space 16 in the first arm 11 with a rotor thereof projecting upward. The second articulated shaft motor 22 is arranged in a position that is between the second coupling part 15 and the working shaft 13 and directly below the first articulated shaft reducer 25 at the lower side of the first arm 11. The second articulated shaft reducer 26 is arranged in a position that is closer to the first arm 11 in the second coupling part 15.

A working-shaft vertical-movement motor 23 moves the working shaft 13 vertically. The working-shaft vertical-movement motor 23 is arranged in a position at a side near the second coupling part 15 in the accommodating space 17. The working shaft 13 is also arranged in the accommodating space 17 of the second arm 12. A working-shaft rotation motor 24 rotates the working shaft 13. The working-shaft rotation motor 24 is arranged to bridge across the second coupling part 15 and the second arm 12. A part of the working-shaft rotation motor 24 is arranged inside of the second coupling part 15. Furthermore, the working-shaft rotation motor 24 is arranged directly below the second articulated shaft reducer 26. In the present embodiment, "directly below" here means that a component, in a state in which the ceiling-mounted SCARA robot 1 has been installed, is arranged in a position at a vertically lower side.

In the accommodating space 17 in the second arm 12, there is provided a step portion that corresponds to the size of the accommodating space 16 of the first arm 11. When the ceiling-mounted SCARA robot 1 is in an accommodated state, the accommodating space 16 of the first arm 11 is put into a position where three sides thereof are surrounded by the step portion and the second coupling part 15. When the ceiling-mounted SCARA robot 1 is in an accommodated state, the working-shaft vertical-movement motor 23 is positioned directly below the second articulated shaft motor 22.

As the working-shaft rotation motor 24 is arranged directly below the second articulated shaft reducer 26 while at least a part thereof is inside of the second coupling part 15, the working-shaft rotation motor 24 is arranged to be as close as possible to a second articulated shaft J2. As the working-shaft vertical-movement motor 23 is arranged in a position at a side near the second coupling part 15 within the accommodating space 17 of the second arm 12, the working-shaft vertical-movement motor 23 is arranged to be as close as possible to the second articulated shaft J2.

As the working-shaft rotation motor 24 and the working-shaft vertical-movement motor 23, which are heavy parts, are arranged in a position close to the second articulated shaft J2, it becomes possible to reduce an inertia force on the second arm 12. Due to this, it is possible to reduce a load on the second articulated shaft motor 22 and the second articulated shaft reducer 26 for driving the second arm 12.

As the second articulated shaft motor 22 is arranged in the accommodating space 16 that is positioned at the lower side of the first arm 11 with the rotor thereof projecting upward, the second articulated shaft motor 22 is positioned to be closer to a first articulated shaft J1 as compared to a case where the second articulated shaft motor 22 is positioned at an upper side of the first arm 11 with the rotor thereof projecting downward. By arranging the second articulated shaft motor 22 below the first articulated shaft reducer 25, it is arranged to be as close as possible to the first articulated shaft J1. By arranging the second articulated shaft motor 22, which is a heavy part, in a position close to the first articulated shaft J1, it is possible to reduce an inertia force on the first arm 11. Due to this, it becomes possible to reduce a load on the first articulated shaft motor 21 and the first articulated shaft reducer 25 for driving the first arm 11.

Furthermore, when the ceiling-mounted SCARA robot 1 is in an accommodated state, the working-shaft vertical-movement motor 23 is positioned directly below the second articulated shaft motor 22, and therefore the second articulated shaft motor 22, the working-shaft vertical-movement motor 23, and the working-shaft rotation motor 24 are gathered in a position as close as possible to the first articulated shaft J1. Accordingly, when the first arm 11 is driven while the ceiling-mounted SCARA robot 1 is in an accommodated state, it is possible to reduce a load on the first articulated shaft motor 21 and the first articulated shaft reducer 25. Accordingly, the ceiling-mounted SCARA robot 1 can reduce a load caused by driving of arms. According to the present embodiment, it is possible to obtain a light-weight and highly rigid arm that can perform high-speed operations.

INDUSTRIAL APPLICABILITY

As described above, the ceiling-mounted SCARA robot according to the present invention can reduce a load caused by driving of an arm, and therefore the ceiling-mounted SCARA robot is particularly suitable for works that require faster and frequent operations.

REFERENCE SIGNS LIST 1 ceiling-mounted SCARA robot
10 base
11 first arm
12 second arm
13 working shaft
14 first coupling part
15 second coupling part
16, 17 accommodating space
21 first articulated shaft motor
22 second articulated shaft motor
23 working-shaft vertical-movement motor
24 working-shaft rotation motor
25 first articulated shaft reducer
26 second articulated shaft reducer
J1 first articulated shaft
J2 second articulated shaft

The invention claimed is:
1. A ceiling-mounted SCARA robot comprising:
a base;
a first arm that is connected to a lower side of the base via a first coupling part centering around a first articulated shaft and that can pivotally move around the first articulated shaft as a center of pivotal movement within a horizontal plane;

a second arm that is connected to a lower side of the first arm via a second coupling part centering around a second articulated shaft and that can pivotally move around the second articulated shaft as a center of pivotal movement within a horizontal plane, wherein the first arm, the second arm and the second coupling part are designed such that the second arm is capable of being accommodated below the first arm;

a working shaft that is mounted on the second arm;

a second articulated shaft motor and a second articulated shaft reducer for driving the second arm; and a working-shaft rotation motor that rotates the working shaft, wherein the second articulated shaft reducer is provided on the second coupling part, the working-shaft rotation motor is arranged directly below the second articulated shaft reducer, and wherein at least a part of the working-shaft rotation motor is arranged inside of the second coupling part.

2. A ceiling-mounted SCARA robot comprising:

a base;

a first arm that is connected to a lower side of the base via a first coupling part centering around a first articulated shaft and that can pivotally move around the first articulated shaft as a center of pivotal movement within a horizontal plane;

a second arm that is connected to a lower side of the first arm via a second coupling part centering around a second articulated shaft and that can pivotally move around the second articulated shaft as a center of pivotal movement within a horizontal plane, wherein the first arm, the second arm and the second coupling part are designed such that the second arm is capable of being accommodated below the first arm;

a working shaft that is mounted on the second arm;

a second articulated shaft motor and a second articulated shaft reducer for driving the second arm; and a working-shaft rotation motor that rotates the working shaft; and a working-shaft vertical-movement motor that moves the working shaft vertically, wherein the second articulated shaft reducer is provided on the second coupling part, the working-shaft rotation motor is arranged directly below the second articulated shaft reducer, and wherein an accommodating space that is arranged to be in parallel to the second coupling part in a horizontal direction is provided in the second arm, and the working-shaft vertical-movement motor is arranged in a position at a side near the second coupling part in the accommodating space of the second arm.

3. A ceiling-mounted SCARA robot comprising:

a base;

a first arm that is connected to a lower side of the base via a first coupling part centering around a first articulated shaft and that can pivotally move around the first articulated shaft as a center of pivotal movement within a horizontal plane;

a second arm that is connected to a lower side of the first arm via a second coupling part centering around a second articulated shaft and that can pivotally move around the second articulated shaft as a center of pivotal movement within a horizontal plane, wherein the first arm, the second arm and the second coupling part are designed such that the second arm is capable of being accommodated below the first arm;

a working shaft that is mounted on the second arm;

a second articulated shaft motor and a second articulated shaft reducer for driving the second arm; and a working-shaft rotation motor that rotates the working shaft, wherein the second articulated shaft reducer is provided on the second coupling part, the working-shaft rotation motor is arranged directly below the second articulated shaft reducer, and wherein an accommodating space that is arranged to be in parallel to the second coupling part in a horizontal direction is provided in the first arm, and the second articulated shaft motor is arranged in the accommodating space of the first arm.

4. The ceiling-mounted SCARA robot according to claim 3, further comprising a working-shaft vertical-movement motor that moves the working shaft vertically, wherein at a time of an accommodated state where the second arm is accommodated below the first arm, the working-shaft vertical-movement motor is positioned directly below the second articulated shaft motor.

* * * * *